(12) United States Patent
Bouchet et al.

(10) Patent No.: US 10,212,060 B2
(45) Date of Patent: Feb. 19, 2019

(54) METHODS FOR MONITORING QUANTITIES OF COMPUTER DEVICES, ASSOCIATED COMPUTER PROGRAM AND DEVICE

(71) Applicant: BULL SAS, Les Clayes-sous-Bois (FR)

(72) Inventors: Alain Bouchet, Villiers-adam (FR); Bruno Farcy, Jouars-pontchartrain (FR)

(73) Assignee: BULL SAS, Les Clayes-sous-Bois (FR)

( * ) Notice: Subject to any disclaimer, the term of this patent is extended or adjusted under 35 U.S.C. 154(b) by 62 days.

(21) Appl. No.: 14/359,570

(22) PCT Filed: Oct. 19, 2012

(86) PCT No.: PCT/FR2012/052392
§ 371 (c)(1),
(2) Date: May 20, 2014

(87) PCT Pub. No.: WO2013/076393
PCT Pub. Date: May 30, 2013

(65) Prior Publication Data
US 2014/0297858 A1    Oct. 2, 2014

(30) Foreign Application Priority Data

Nov. 21, 2011  (FR) ..................................... 11 60579

(51) Int. Cl.
*H04L 12/26*    (2006.01)
*G06F 11/30*    (2006.01)

(52) U.S. Cl.
CPC ........ *H04L 43/065* (2013.01); *G06F 11/3006* (2013.01); *G06F 11/3062* (2013.01); *G06F 11/3065* (2013.01); *H04L 43/02* (2013.01)

(58) Field of Classification Search
CPC ............ H04L 41/5006; H04L 41/5009; H04L 41/5058; H04L 41/5083; H04L 41/5906; H04L 43/028; H04L 43/0829; H04L 43/0894; H04L 43/12; H04L 45/00; H04L 45/14; H04L 45/24; H04L 45/7453; H04L 47/11; H04L 67/38; H04L 69/08; H04L 69/324; H04L 69/40; H04L 67/2833;
(Continued)

(56) References Cited

U.S. PATENT DOCUMENTS

| 6,757,681 B1* | 6/2004 | Bertram ................ H04L 43/022 |
| 2002/0083110 A1* | 6/2002 | Kozuch ................. G06F 1/3203 718/1 |

(Continued)

FOREIGN PATENT DOCUMENTS

EP    1 115 056 A2    7/2001

OTHER PUBLICATIONS

International Search Report for PCT/FR2012/052392, dated Dec. 11, 2012.

*Primary Examiner* — David R Lazaro
*Assistant Examiner* — Berhanu Shitaywoldetadik
(74) *Attorney, Agent, or Firm* — Pillsbury Winthrop Shaw Pittman LLP

(57) ABSTRACT

A method for monitoring a quantity of a computer device, including measuring values adopted by the quantity over time, determining a measured value, or extremum value, meeting at least one transmission criterion, in which the extremum value is a local extremum, and transmitting the extremum value.

17 Claims, 2 Drawing Sheets

(58) Field of Classification Search
CPC ..... H04L 67/32; H04L 67/322; H04L 67/325;
H04L 67/327; H04L 43/02; H04L 43/065;
G06N 99/005; G06N 7/00; G06F
17/30958; G06F 11/3006; G06F 11/3062;
G06F 11/3065
USPC .................................................. 709/224–245
See application file for complete search history.

(56) References Cited

U.S. PATENT DOCUMENTS

| | | | |
|---|---|---|---|
| 2004/0133401 A1* | 7/2004 | Kato ..................... | G06F 11/321 |
| | | | 702/188 |
| 2004/0215679 A1 | 10/2004 | Beaumont | |
| 2006/0165000 A1* | 7/2006 | Nakaminami ...... | H04L 67/1008 |
| | | | 370/242 |
| 2006/0178918 A1* | 8/2006 | Mikurak ................ | G06Q 10/06 |
| | | | 705/7.25 |
| 2009/0030279 A1* | 1/2009 | Zander ............... | A61B 1/00036 |
| | | | 600/118 |
| 2009/0083444 A1* | 3/2009 | Faist .................... | G05B 19/042 |
| | | | 709/248 |
| 2009/0222555 A1* | 9/2009 | Qian ................... | H04L 41/5003 |
| | | | 709/224 |
| 2013/0084851 A1* | 4/2013 | Li ........................ | H04W 24/00 |
| | | | 455/424 |
| 2013/0314073 A1* | 11/2013 | Nebu ..................... | G06Q 50/06 |
| | | | 324/103 R |

* cited by examiner

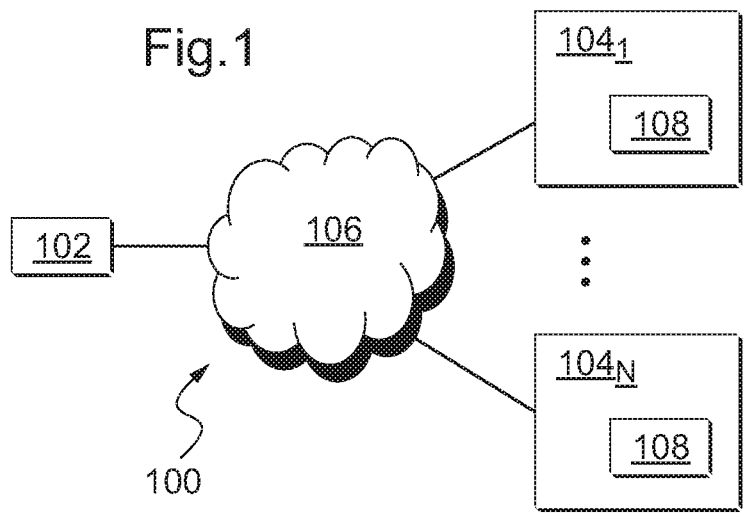
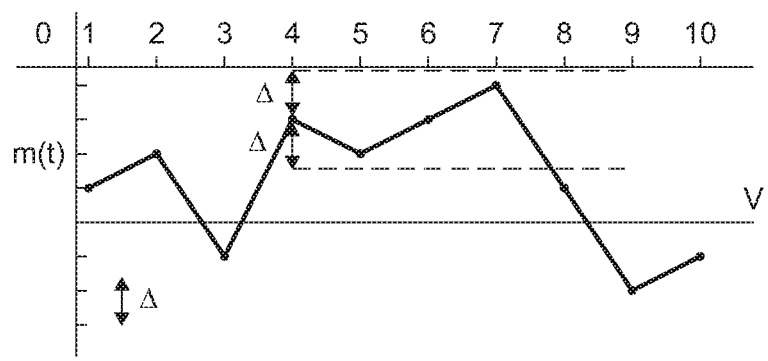

METHODS FOR MONITORING QUANTITIES OF COMPUTER DEVICES, ASSOCIATED COMPUTER PROGRAM AND DEVICE

CROSS REFERENCE TO RELATED APPLICATIONS

This is the U.S. National Stage of PCT/FR2012/052392, filed Oct. 19, 2012, which in turn claims priority to French Patent Application No. 1160579, filed Nov. 21, 2011, the entire contents of all applications are incorporated herein by reference in their entireties.

TECHNICAL FIELD

The present invention relates to a method for monitoring a quantity of a computer device.

BACKGROUND

The invention applies advantageously in the case of a quantity that varies continuously, that is to say the value whereof changes continuously over time—for example, the value whereof changes at least once per second.

It also relates to a computer program and an associated device, along with a method for monitoring quantities of computer devices.

In the present description, and in the claims, the following terminology is used.

The present invention uses a sequence of values of a quantity, that is to say successive values adopted by the quantity at discrete times, equally distributed over time or not.

A difference between two values indicates a difference in value and not a timing difference.

A value preceding another value is the value situated immediately before this other value in the sequence of values (there is no value between them).

A value following another value is the value situated immediately after this other value in the sequence of values (there is no value between them).

A prior value in respect of another value is a value situated before this other value in the sequence of values (there may be one or a plurality of values between them).

A posterior value in respect of another value is a value situated after this other value in the sequence of values (there may be one or a plurality of values between them).

A local extremum is a value either greater or less than both the value preceding same and the value following same.

A small variation value is a posterior value in respect of a local extremum transmitted, referred to as the last local extremum before small variation, having therewith a difference less than a predefined difference and which either follows same, or is only separated therefrom by one or a plurality of other small variation values, that is to say which each have a difference less than the predefined difference therewith.

A last small variation value is a small variation value which is followed by a measured value having a difference with the last local extremum before small variation greater than the predefined difference.

Most computer device monitoring applications still currently use a regular querying method triggered by an administration server, to obtain information from the computer devices monitored.

When such an application monitors a small number of computer devices, this method has a number of advantages, but when the number of computer devices monitored increases for example in the case of large sets of computer devices (referred to as "clusters") for intensive computing, this method very soon reaches the limits thereof: indeed, the queries sent by the administration server increase in a linear fashion with the number of computer devices monitored and lead to saturation of the pass-band of the administration network or the power available on the administration server.

A conventional response to this situation is that of switching to "push" mode monitoring: the computer devices monitored take the initiative to send an item of information relating to said device to the administration server, which remains continuously on standby for these notifications. This approach is perfectly suitable for reporting "accidental" or occasional events, such as faults, temperature threshold overshoots. Indeed, these events are low in frequency and replacing a frequently unnecessary regular query sent by the administration server by the transmission from the computer device in question of the relevant information solely at the time of the occurrence of the event makes it possible to reduce the need for network pass-band and processing power on the administration server to the minimum thereof.

This conventional response is not as useful if the monitoring does not relate to events with a low frequency, but to a continuous quantity of the computer device: the electrical consumption thereof for example.

In the case of a continuous quantity, it is known to define a certain number of value thresholds, regularly spaced or not and covering the entire range of possible values for the quantity. Each overshoot of a threshold is then considered to be an event, giving rise to a transmission of the value of the quantity by the computer device. This technique has the drawback of not being precise when the values of the quantity stabilize and change between two thresholds.

For this purpose, a method for monitoring a quantity of a computer device is proposed, comprising:
  measuring values adopted by the quantity over time,
  characterized in that it further comprises:
  determining a measured value, or extremum value, meeting at least one transmission criterion, the transmission criterion/criteria met by the extremum value comprising: the extremum value is a local extremum,
  transmitting the extremum value.

Optionally, the transmission criterion/criteria met by the extremum value further comprise: the extremum value has a difference with the last local extremum transmitted greater than a predefined difference.

Indeed, it has been observed that a transmitted local extremum is frequently followed by a certain number of values varying little relative to said value, for example oscillating around the local extremum value. Transmitting all the local extrema during these small variations would merely be of little interest since they would all have almost the same value. In this way, adding the transmission criterion whereby the extremum value has a difference with the last local extremum transmitted greater than a predefined difference makes it possible to prevent transmission during small variations.

Optionally, the last local extremum transmitted, or last local extremum before small variation, is followed by one or a plurality of measured values, or small variation values, each having a difference with the last local extremum before small variation, less than the predefined difference.

Optionally, the method further comprises:
  determining the last small variation value, that is to say the small variation value which is followed by a measured value having a difference with the last local extremum before small variation greater than the predefined difference,
  transmitting the last small variation value.

By means of the transmission of the last small variation value, the administration server knows how long the small variations lasted, and thus has a more accurate idea of the progression of the monitored quantity.

Optionally, the method further comprises:
  determining a measured value, or crossing value, such that one of the crossing value and the measured value preceding same is greater than a predefined threshold whereas the other value is less than this predefined threshold,
  transmitting the crossing value.

Optionally, the measured values other than the extremum values and/or the last small variation values and/or the crossing values are not transmitted.

Optionally, the monitored quantity is the electrical consumption of the computer device.

A method for monitoring quantities of computer devices is also proposed, each computer device being connected to the same administration server via a communication network, comprising: for each computer device, performing a method for monitoring a quantity of the computer device according to the invention, wherein the transmitted value(s) are transmitted to the administration server via the communication network.

A computer program downloadable from a communication network and/or saved on a computer-readable medium and/or executable by a processor is also proposed, characterized in that it comprises instructions for executing steps of a monitoring method according to the invention, when said program is executed on at least one computer.

A computer device for monitoring a quantity of a computer device is also proposed, comprising:
  means for measuring values adopted by the quantity over time, characterized in that it further comprises:
  means for determining a measured value, or extremum value, meeting at least one transmission criterion, the transmission criterion/criteria met by the extremum value comprising: the extremum value is a local extremum,
  means for transmitting the extremum value.

BRIEF DESCRIPTION OF THE DRAWINGS

Examples of embodiments of the invention will now be described with reference to the following figures:
FIG. 1 is a schematic view of a computer system according to the invention,
FIG. 3 is a timing diagram of a monitored quantity, illustrating the progress of the method in FIG. 2.

DETAILED DESCRIPTION OF CERTAIN EMBODIMENTS

Figure 2:
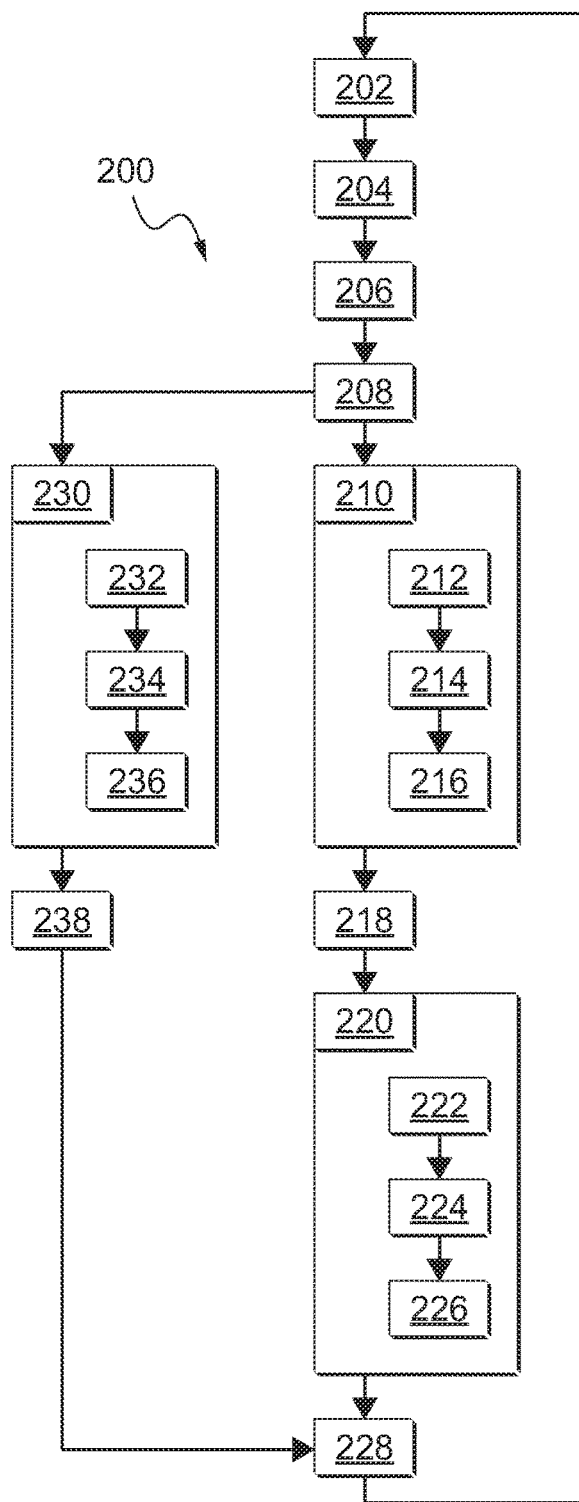
FIG. 2 is a block diagram of a monitoring method according to the invention.

With reference to FIG. 1, an example 100 of a computer system according to the invention comprises an administration server 102 and computer devices 104$_1$ ... 104$_N$, each connected to the administration server 102 via a communication network 106.

Each computer device 104$_1$ ... 104$_N$ comprises means 108 for performing a method according to the invention for monitoring a quantity of the computer device, such as the electrical consumption of this computer device, such as that described hereinafter with reference to FIG. 2. In the example described, these means are in the form of local monitoring software, that is to say software executed by the device. Alternatively, these means 108 could be in the form of electronic circuits, or a combination of electronic circuits and computer programs.

In the local monitoring software, the following parameters are defined:
  the number n of thresholds $V_1$,
  the difference V between two thresholds, such that $V_i = V_{min} + i \times V$ ($V_{min}$ being the lowest threshold),
  a predefined difference $\Delta$.

These parameters are dynamically modifiable by the administration server in order to enable manual adaptation by the administrator in charge of monitoring the computer devices, or even self-adaptation by the software of the administration server.

Moreover, the local monitoring software uses the following context variables, in order to make a decision in respect of transmission of a value according to the last measured value (or current value m(t)):
  the measured value m(t−1) preceding the current value m(t),
  the threshold index i(t−1) representing the index of the threshold situated below the preceding value m(t−1), such that: $V_{i(t-1)} < m(t-1) < V_{i(t-1)+1}$,
  the direction of progression d(t−1) between the time t−2 and the time t−1,
  a status indicator osc(t−1), suitable for adopting the values true, false, indicating whether the preceding value is a small variation value,
  the value of the last local extremum value before small variation, annotated lev.

These context variables need to be stored in memory between two measurements. As they are limited in number, the storage space used is not significant, enabling the local monitoring software to be executed by low-power computer devices.

With reference to FIG. 2, an example 200 of a method according to the invention implemented by the local monitoring device will now be described.

During a step 202, the local monitoring software measures the value of the monitored quantity m at the time t, this value being called the current value m(t). In this way, as the loops progress, the local monitoring software measures the values adopted by the quantity m over time. The local monitoring software then goes to a step 204.

During the step 204, the local monitoring software determines whether a predefined threshold $V_j$ has been crossed by the monitored value between the preceding value m(t−1) and the current value m(t), that is to say one of these two values is less than the predefined threshold whereas the other value is greater than the predefined threshold. In the example described, the local monitoring software performs this determination by comparing the threshold indexes i(t) and i(t−1) for the current value m(t) and for the preceding value m(t−1).

If a threshold has been crossed, the current value m(t) is called the crossing value, and the local monitoring software then goes to a step 206, otherwise, it goes to a step 208.

During the step 206, the local monitoring software transmits the crossing value (the current value m(t)) to the administration server. The transmission is performed such that the administration server can determine the time t at which the transmitted value m(t) was measured. For example, this time t is transmitted at the same time as the value m(t), either in the form of a time (and optionally a date), or in the form of an index if the measurements are made at regular time intervals.

The local monitoring software then goes to the step 208.

During the step 208, the local monitoring software determines whether the measured value, or preceding value m(t−1), preceding the current value m(t), is a small variation value or not.

In the example described, to perform the step, the local monitoring software takes the result of the step 220 or the step 230, performed in the preceding loop on the preceding value m(t−1). These two steps will be described hereinafter. If the preceding value m(t−1) is a small variation value, the local monitoring software goes to a step 210, otherwise it goes to a step 230.

During the step 210, the local monitoring software determines whether the preceding value m(t−1) is a local extremum.

In the example described, to perform the step 2•1 0, the local monitoring software performs the steps 212 to 21 6.

During the step 212, the local monitoring software determines whether the current measured value m(t) is greater or less than the preceding measured value m(t−1). This determination gives the direction of progression, annotated d(t), between the time t−1 and the time t. The direction of progression d(t) is equal to 1 if the current value m(t) is greater than the preceding value m(t−1) and equal to 0 if the current value m(t) is less than the preceding value m(t−1).

During the step 214, the local monitoring software determines whether the preceding value m(t−1) is greater or less than the measured value, or double preceding value m(t−2), preceding the preceding value m(t−1). In the example described, the local monitoring software takes the result of the step 212 performed the previous loops, that is to say the direction of progression d(t−1) at the time t−1.

During the step 216, the local monitoring software infers that the preceding measured value is local extremum if the preceding value m(t−1) is either greater, or less than, both, the current value m(t) and the double preceding value m(t−2). In the example described, the local monitoring software compares the direction of progression d(t−1) and the direction of progression d(t).

If the preceding step m(t−1) is determined in step 210 as a local extremum, then the preceding value m(t−1) meets the following conditions:
  the preceding value m(t−1) is a local extremum, and
  the preceding value m(t−1) is not a small variation value (result determined in step 208), meaning that it has a difference with the last local extremum transmitted greater than the predefined difference Δ.

In this case, the preceding value m(t−1) is called the extremum value and the local monitoring software goes to a step 218.

If the preceding value m(t−1) is not determined in step 210 as a local extremum, the local monitoring software goes to a step 220.

During the step 218, the local monitoring software transmits the extremum value (the preceding value m(t−1)) to the administration server. As for the step 206, the transmission is performed such that the administration server can determine the time t−1 at which the transmitted value m(t−1) was measured. The local monitoring software then goes to the step 220.

During the step 220, the local monitoring software determines whether the current value m(t) is a small variation value or not. If the current value m(t) is a small variation value, the preceding value m(t−1) (which is a local extremum according to the result of the step 210 and which was transmitted in the step 218) thus becomes the last local extremum before small variation, annotated lev.

In the example described, to perform the step 220, the local monitoring software performs the steps 222 to 226.

During the step 222, the local monitoring software determines the difference between the current value m(t) and the preceding value m(t−1). The local monitoring software then goes to the step 224.

During the step 224, the local monitoring software compares the difference determined with the predefined difference Δ. The local monitoring software then goes to the step 226.

During the step 226, the local monitoring software infers from the comparison performed in the step 224 that the current value m(t) of the monitored quantity is a small variation value if the difference determined is less than the predefined difference Δ.

The local monitoring software then goes to the step 228.

During the step 228, the time index t is incremented and the local monitoring software returns to the step 202.

During the step 230, wherein the local monitoring software goes to the remainder of the step 208 when the preceding value m(t−1) is determined as being a small variation value, the local monitoring software determines whether the current value m(t) is a small variation value or not.

In the example described, to perform the step 230, the local monitoring software performs the steps 232 to 236.

During the step 232, the local monitoring software determines the difference between the current measured value m(t) and the last local extremum before small variation lev. The local monitoring software then goes to the step 234.

During a step 234, the local monitoring software compares the difference determined with the predefined difference Δ. The local monitoring software then goes to the step 236.

During a step 236, the local monitoring software infers from the comparison performed in the step 234 that the current value m(t) is a small variation value if the difference determined is less than the predefined difference Δ. The local monitoring software infers that the current value m(t) is not a small variation value otherwise.

If the current value m(t) is not determined as a small variation value, then the preceding value m(t−1) meets the following conditions:
  the preceding value m(t−1) is a small variation value,
  the preceding value m(t−1) is followed by a measured value which is not a small variation value.

In this way, the preceding value is a last small variation value and the local monitoring software then goes to a step 238.

If the current value m(t) is not determined as a small variation value, the local monitoring software then goes to the step 228.

During the step 238, the local monitoring software transmits the last small variation value (the preceding value m(t−1)) to the administration server. As for the steps 206 and 218, the transmission is performed such that the administration server can determine the time t−1 at which the transmitted value m(t−1) was measured. The local monitoring software then goes to the step 228.

With reference to FIG. 3, an example of progress of the method in FIG. 2 will be described. In this example, a single threshold V is envisaged.

At t=3

The local monitoring software determines that the threshold V has been crossed and transmits the value m(3) to the administration server (steps 204 and 206).

The local monitoring software further determines that the value m(2) is not a small variation value but is a local extremum, and thus transmits the value m(2) (steps 208, 210 and 218).

The local monitoring software further determines that the value m(3) is not a small variation value (step 220).

At t=4

The local monitoring software determines that the threshold V has been
crossed and transmits the value m(4) to the administration server (steps 204 and 206).

The local monitoring software further determines that the value m(3) is not a small variation value but is a local extremum, and thus transmits the value m(3) (steps 208, 210 and 218).

The local monitoring software further determines that the value m(4) is not a small variation value (step 220).

At t=5

The local monitoring software determines that the value m(4) is not a small variation value but is a local extremum, and thus transmits the value m(4) (steps 208, 210 and 218).

The local monitoring software further determines that the value m(5) is a small variation value (step 220).

The value m(4) is thus a last local extremum before small variation lev.

At t=6

The local monitoring software determines that the value m(5) is a small variation value (step 208).

The local monitoring software further determines that the value m(6) is a small variation value (step 230).

At t=7

The local monitoring software determines that the value m(6) is a small variation value (step 208).

The local monitoring software further determines that the value m(7) is a small variation value (step 230).

At t=8

The local monitoring software determines that the value m(7) is a small variation value (step 208), but that the value m(8) is not a small variation value (step 230).

Consequently, the local monitoring software transmits the value m(7) (step 238).

At t=9

The local monitoring software determines that the threshold V has been crossed and transmits the value m(9) to the administration server (steps 204 and 206).

The local monitoring software further determines that the value m(8) is not a small variation value (step 208) and that it is not a local extremum (step 210).

At t=10

The local monitoring software further determines that the value m(9) is not a small variation value anti is a local extremum, and thus transmits the value m(9) (steps 208, 210 and 218).

The invention is not limited to the examples of embodiments described above, but however defined by the claims hereinafter.

Indeed, it would be obvious for those skilled in the art that various modifications may be made to the examples of embodiments described above, in the but however defined by the claims hereinafter.

Indeed, it would be obvious for those skilled in the art that various modifications may be made to the examples of embodiments described above, in the light of the teaching disclosed herein.

For example, in one enhancement of the method described with reference to FIGS. 2 and 3, the local monitoring software checks, in the transmission steps 206, 218 and 238, whether the value about to be transmitted has already been previously transmitted. This may for example be implemented by adding a context variable which memorizes whether the preceding value has been transmitted or not, and by checking the value of this variable before each transmission. If the value about to be transmitted was previously transmitted, the value is not transmitted again, making it possible to prevent duplicate transmissions, as they appear for example in the example in FIG. 3, where the values m(3) and m(9) are each transmitted twice.

Furthermore, in the claims hereinafter, the terms used should not be interpreted as limiting the claims to the features in the examples of embodiments described above, but should be interpreted to include any equivalents which can be envisaged by those skilled in the art by applying their general knowledge.

The invention claimed is:

1. A method for monitoring an operational characteristic quantity of a computer device in a computer network cluster communicatively coupled to an administration server via a communication network, the method comprising:
measuring a plurality of values adopted by the quantity over time,
determining: (i) if a first measured value is a local extremum; (ii) if a second measured value is a last local extremum with respect to the first measured value; (iii) if the second measured value has been previously transmitted to the administration server via the communication network; (iv) if difference from the first measured value and the second measured value is greater than a predefined difference, and
if conditions (i), (ii), (iii) and (iv) are verified, transmitting the first measured value to the administration server via the communication network,
if conditions (i), (ii), (iii) and (iv) are not verified, not transmitting the first measured value to the administration server via the communication network unless at least one first other condition for transmitting the first measured value to the administration server via the communication network is verified.

2. The monitoring method of claim 1, wherein the at least one first other condition comprises:
determining: (v) if a third measured value is a local extremum; (vi) if said third measured value has been transmitted to the administration server via the communication network; (vii) if said third measured value is directly followed by one or more measured values having each a difference from said third measured value which is less than the predefined difference; (viii) if said one or more measured values are directly followed by a fourth measured value having a difference from said third measured value which is more than the predefined difference; and
if conditions (v), (vi), (vii) and (viii) are verified,
transmitting the first measured value to the administration server via the communication network unless at least one second other condition for transmitting the first measured value to the administration server via the communication network is verified.

3. The monitoring method of claim 2, wherein the at least one second other condition comprises:
   determining: (ix) if a fifth measured value is directly preceding the first measured value; (x) if one amongst said fifth measured value and said first measured value is smaller than a predefined threshold, while the other is greater than the predefined threshold; and
   if conditions (ix) and (x) are verified, transmitting the first measured value to the administration server via the communication network,
   if conditions (ix) and (x) are not verified, not transmitting the first measured value to the administration server via the communication network unless at least one third other condition for transmitting the first measured value to the administration server via the communication network is verified.

4. The monitoring method of claim 1, wherein the at least one first other condition comprises:
   determining: (ix) if a fifth measured value is directly preceding a sixth measured value; (x) if one amongst said fifth measured value and said sixth measured value is smaller than a predefined threshold, while the other is greater than the predefined threshold; and
   if conditions (ix) and (x) are verified, transmitting the first measured value to the administration server via the communication network unless at least one second other condition for transmitting the first measured value to the administration server via the communication network is verified.

5. The monitoring method of claim 4, wherein the at least one second other condition comprising:
   determining: (v) if a third measured value is a local extremum; (vi) if said third measured value has been transmitted to the administration server via the communication network; (vii) if said third measured value is directly followed by one or more measured values having each a difference from said third measured value which is less than the predefined difference; (viii) if said one or more measured values are directly followed by a fourth measured valued having a difference from said third measured value which is more than the predefined difference, wherein the last one of said one or more measured values is the first measured value, and;
   if conditions (v), (vi), (vii) and (viii) are verified, transmitting the last one of said one or more measured values to the administration server via the communication network, and
   if conditions (v), (vi), (vii) and (viii) are not verified, not transmitting unless at least one third other condition for transmitting the first measured value to the administration server via the communication network is verified.

6. The monitoring method of claim 1, wherein the monitored operational characteristic quantity is an electrical consumption of the computer device.

7. A monitoring module for monitoring an operational characteristic quantity of a computer device in a computer network cluster communicatively coupled to an administration server via a communication network, the monitoring module comprising:
   means for measuring a plurality of values adopted by the operational characteristic quantity over time;
   means for determining: (i) if a first measured value is a local extremum; (ii) if a second measured value is a last local extremum with respect to the first measured value; (iii) if the second measured value has been previously transmitted to the administration server via the communication network; (iv) if a difference from the first measured value and the second measured value is greater than a predefined difference; and
   means for transmitting, if conditions (i), (ii), (iii) and (iv) are verified, the first measured value to the administration server via the communication network or if conditions (i), (ii), (iii) and (iv) are not verified, not transmitting the first measured value to the administration server via the communication network unless at least one first other condition for transmitting the first measured value to the administration server via the communication network is verified.

8. A method for monitoring operational characteristic quantities of computer devices, comprising:
   operably coupling a plurality of computer devices to an administration server via a communication network;
   measuring, by each said computer device, a plurality of values adopted by the operational characteristic quantities over time;
   determining, by each said computer device, (i) if a first measured value is a local extremum; (ii) if a second measured value is a last local extremum with respect to the first measured value; (iii) if the second measured value has been previously transmitted to the administration server via the communication network; (iv) if a difference from the first measured value and the second measured value is greater than a predefined difference; and
   transmitting, by each said computer device, if conditions (i), (ii), (iii) and (iv) are verified, the first measured value to the administration server via the communication network or if conditions (i), (ii), (iii) and (iv) are not verified, not transmitting the first measured value to the administration server via the communication network unless at least one first other condition for transmitting the first measured value to the administration server via the communication network is verified.

9. The monitoring method of claim 8, wherein the at least one first other condition comprises:
   determining, by each of said computer device, (v) if a third measured value is a local extremum; (vi) if said third measured value has been transmitted to the administration server via the communication network; (vii) if said third measured value is directly followed by one or more measured values having each a difference from said third measured value which is less than the predefined difference; (viii) if said one or more measured values are directly followed by a fourth measured valued having a difference from said third measured value which is more than the predefined difference; and
   transmitting, by each said computer device, if conditions (v), (vi), (vii) and (viii) are verified, the first measured value to the administration server via the communication network, or verifying at least one second other condition for transmitting the first measured value to the administration server via the communication network.

10. The monitoring method of claim 9, wherein the at least one second other condition comprises:
    determining: (ix) if a fifth measured value is directly preceding the first measured value; (x) if one amongst said fifth measured value and said first measured value is smaller than a predefined threshold, while the other is greater than the predefined threshold; and
    if conditions (ix) and (x) are verified, transmitting the first measured value to the administration server via the communication network, if conditions (ix) and (x) are not verified, not transmitting the first measured value to the administration server via the communication network unless at least one third other condition for transmitting the first measured value to the administration server via the communication network is verified.

11. The monitoring method of claim 8, wherein the at least one first other condition comprises:

determining, by each said computer device: (ix) if a fifth measured value is directly preceding a sixth measured value; (x) if one amongst said fifth measured value and said sixth measured value is smaller than a predefined threshold; and transmitting, by each said computer device, if conditions (ix) and (x) are verified, the first measured value to the administration server via the communication network unless at least one second other condition for transmitting the first measured value to the administration server via the communication network is verified.

12. The monitoring method of claim 8, wherein the monitored quantity is an electrical consumption of the computer device.

13. A non-transitory computer-readable medium upon which is embodied a sequence of programmed instructions which, when executed by a processor, causes the processor to monitor operational characteristic quantities of computer devices by performing the following:

measuring a plurality of values adopted by the operational characteristic quantity over time;

determining: (i) if a first measured value is a local extremum; (ii) if a second measured value is a last local extremum with respect to the first measured value; (iii) if the second measured value has been previously transmitted to the administration server via the communication network; (iv) if a difference from the first measured value and the second measured value is greater than a predefined difference; and if conditions (i), (ii), (iii) and (iv) are verified, transmitting the first measured value to the administration server via the communication network, if conditions (i), (ii), (iii) and (iv) are not verified, not transmitting the first measured value to the administration server via the communication network unless at least one first other condition for transmitting the first measured value to the administration server via the communication network is verified.

14. The non-transitory computer-readable medium of claim 13, wherein said wherein the at least one first other condition comprises:

determining: (v) if a third measured value is a local extremum; (vi) if said third measured value has been transmitted to the administration server via the communication network; (vii) if said third measured value is directly followed by one or more measured values having each a difference from said third measured value which is less than the predefined difference; (viii) if said one or more measured values are directly followed by a fourth measured valued having a difference from said third measured value which is more than the predefined difference; and if conditions (v), (vi), (vii) and (viii) are verified, first measured value to the administration server via the communication network or verifying at least one second other condition for transmitting the first measured value to the administration server via the communication network is verified.

15. The non-transitory computer-readable medium of claim 14, wherein said at least one second other condition comprises:

determining: (ix) if a fifth measured value is directly preceding the first measured value; (x) if one amongst said fifth measured value and said first measured value is smaller than a predefined threshold, while the other is greater than the predefined threshold; and if conditions (ix) and (x) are verified, transmitting the first measured value to the administration server via the communication network, if conditions (ix) and (x) are not verified, not transmitting the first measured value to the administration server via the communication network unless at least one third other condition for transmitting the first measured value to the administration server via the communication network is verified.

16. The non-transitory computer-readable medium of claim 13, wherein said wherein the at least one first other condition comprises:

determining: (ix) if a fifth measured value is directly preceding a sixth measured value; (x) if one amongst said fifth measured value and said sixth measured value is smaller than a predefined threshold, while the other is greater than the predefined threshold; and if conditions (ix) and (x) are verified, transmitting the first measured value to the administration server via the communication network unless at least one second other condition for transmitting the first measured value to the administration server via the communication network is verified.

17. The non-transitory computer-readable medium of claim 13, wherein the monitored quantity is an electrical consumption of the computer device.

* * * * *